March 2, 1965     W. R. WOOTTON     3,171,791
NUCLEAR REACTOR VAPOUR GENERATING PLANT
Filed Dec. 20, 1960     4 Sheets-Sheet 1
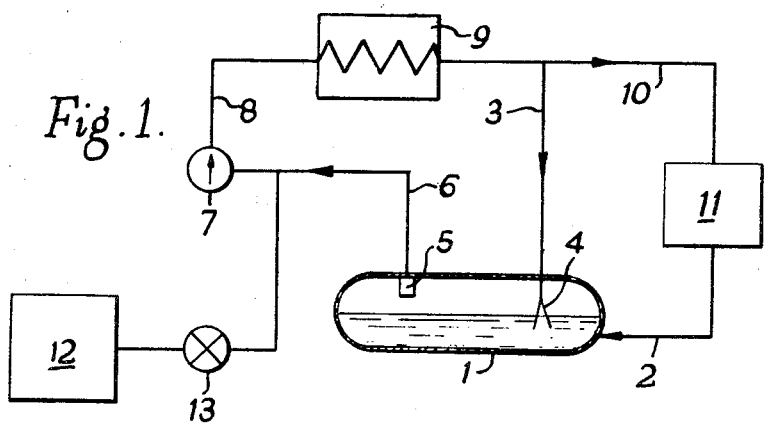
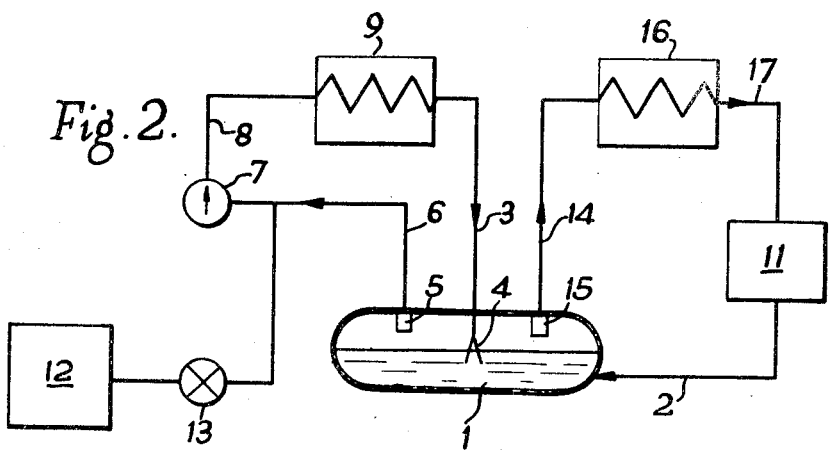
INVENTOR
William R. Wootton
BY
Pennie, Edmonds, Morton, Barrows & Taylor
ATTORNEYS March 2, 1965 W. R. WOOTTON 3,171,791
NUCLEAR REACTOR VAPOUR GENERATING PLANT
Filed Dec. 20, 1960 4 Sheets-Sheet 2

Fig. 3.

INVENTOR
William R. Wootton
BY
Pearne, Edmonds, Morton, Barrows & Taylor
ATTORNEYS

United States Patent Office 3,171,791
Patented Mar. 2, 1965

3,171,791
NUCLEAR REACTOR VAPOUR GENERATING
PLANT
William R. Wootton, London, England, assignor to Babcock & Wilcox Limited, London, England, a British company
Filed Dec. 20, 1960, Ser. No. 77,211
Claims priority, application Great Britain, Dec. 23, 1959, 43,690/59
1 Claim. (Cl. 176—65)

This invention relates to a steam generating plant supplied with heat from a nuclear reactor having as coolant liquid metal comprising sodium, potassium or an alloy of those metals. The advantages to be enjoyed by the use of the said metal as a coolant are well understood, but unfortunately considerable operational hazards are connected with such use, one of the most dangerous being that due to chemical reaction between the liquid metal and water resulting in the generation at high pressure of hydrogen which is liable to combine with oxygen to cause a violent explosion. To lessen this danger, the use of triple concentric tubes has been proposed in which the liquid metal flows through the innermost tube, the intermediate annulus contains a barrier liquid such as mercury and the other annulus contains water, steam or a mixture of the two. As is pointed out in British patent specification No. 846,996, if steam rather than water comes into direct contact with sodium or potassium the risk of an explosive reaction is much reduced, this being particularly the case if the steam is superheated.

The invention disclosed by the aforesaid complete specification includes a method of generating steam according to which heat is generated in a nuclear reactor, liquid metal comprising sodium, potassium or an alloy of these metals is heated by heat generated in the nuclear reactor, steam is superheated by indirect heat transfer from the heated liquid metal and the said steam is generated by heat transfer between the superheated steam and water. In the apparatus disclosed for carrying out the method the boiler unit for affecting steam generation operates through indirect heat exchange between water and the superheated steam.

However, in certain circumstances it is desirable to utilise a direct contact steam generation arrangement since in such an arrangement tubulous heat exchangers are replaced by direct contact steam generators at a saving of initial cost. In a known form of vapour generating plant, a stream of superheated steam is discharged through nozzles into a body of water contained within a drum, the stream of steam being augmented by the production within the drum of steam through direct contact and consequent heat exchange between the superheated steam and the water. The steam is withdrawn from the drum and is forced by a pump though a superheater and a part of the steam thus superheated is re-circulated as the said stream of the drum whilst the remainder is supplied to a steam utiliser. For practical purposes the steam pressure at which the plant is designed to work must be very high. Moreover, the quantity of steam which the pump is required to deliver to the superheater is much greater than that available for use. For example, assuming a feed temperature of 450° Fahrenheit a steam pressure of 2000 pounds per square inch and a steam temperature of 1000° Fahrenheit the delivery rate for the pump is somewhat more than thrice the steam output of the plant. The pump therefore in a high capacity plant presents an engineering problem of great difficulty, whilst the power required to drive the pump is substantial. It will therefore be appreciated that a practical means enabling the size of the pump to be substantially reduced or enabling the pump to be dispensed with would be highly advantageous.

The present invention includes the combination of a nuclear reactor cooled by a liquid alkali metal coolant selected from the group comprising sodium, potassium and a mixture of sodium and potassium, a heat exchanger vessel, liquid alkali metal coolant conducting ducts connecting the nuclear reactor and the heat exchanger vessel, a steam generating and superheating plant having initial means for generating and superheating steam including a pair of superheating means disposed in direct heat exchange relationship with the liquid alkali metal coolant in the heat exchanger vessel and each provided with an inlet and an outlet, connected to the outlet of a first superheating means of the pair of superheating means an initial direct contact heat exchanger having a nozzle means for effecting direct heat exchange between a body of water in the initial direct contact heat exchanger and a stream of superheated steam discharged from the outlet of the first superheating means of the pair of superheating means to produce a stream of saturated steam, said initial means also including flow dividing means connected to the said initial direct contact heat exchanger to divide the said stream of saturated steam between connections to each of the inlets of the pair of superheating means and further including circulating means positioned in the connection between the flow dividing means and the inlet to the first superheater means of the pair of superheating means, the combination also comprising, disposed in indirect heat exchange relationship with the liquid alkali metal coolant within the heat exchanger vessel, a group of superheating means, each superheating means of the said group of superheating means being provided with an inlet and an outlet, the combination further comprising a group of direct heat exchangers, each direct contact heat exchanger of the group of direct contact heat exchangers being provided with an inlet, outlet and, connected to the inlet, a nozzle means for effecting direct contact heat exchange between a body of water in the direct contact heat exchange and a steam of superheated steam discharged through the nozzle, respective direct contact heat exchangers of the group of direct contact heat exchangers and respective superheating means of the group of superheating means being connected alternately in series steam flow relationship, the inlet of the first direct contact heat exchanger of the group of direct contact heat exchangers being connected to the outlet of the second superheating means of the pair of superheating means, the outlet of the first direct contact heat exchanger beng connected to the inlet of the first superheating means of the group of superheating means, the inlet to the second direct contact heat exchanger of the group of direct contact heat exchangers being connected to the outlet of the first superheating means of the group of superheating means, the outlet of the said second direct contact heat exchanger being connected to the inlet of the second superheating means of the group of superheating means, inlets of successive direct contact heat exchangers being connected to respective outlets of preceding superheating means of the group of superheating means, the outlets of the said successive direct contact heat exchangers being connected to respective inlets of subsequent superheating means of the group of superheating means, the outlet of the last superheating means of the group of superheating means being connected for discharge to means for utilising superheated steam and additional indirect heat exchange means interposed between respective direct contact heat exchangers of the group of direct contact heat exchangers and respective superheating means of the group of superheating means and between the initial direct contact heat exchanger and the pair of superheating means to effect heat exchange between steam leaving and steam entering the said heat exchanger vessel to give the steam entering the said heat exchanger vessel a degree of superheat.

The invention will now be described by way of example, with reference to the accompanying, diagrammatic drawings, in which:

FIGURE 1 shows an arrangement of a known form of steam generating and superheating plant;

FIGURE 2 shows one form of a steam generating and superheating plant according to an aspect of the present invention;

FIGURE 3 shows another form of a steam generating and superheating plant according to another aspect of the present invention;

Figure 4:
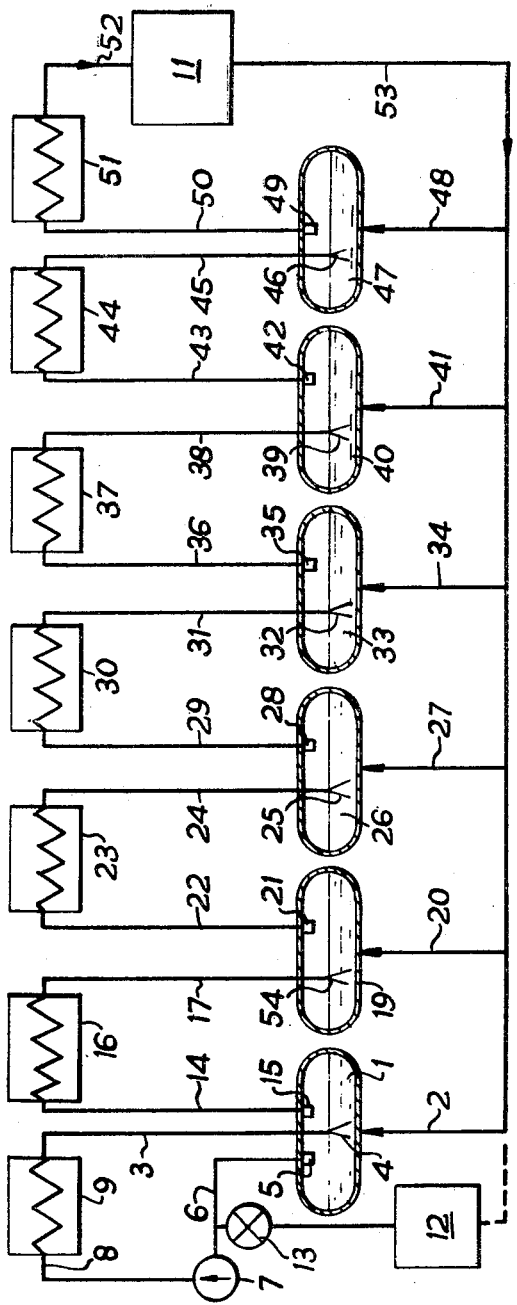
FIGURE 4 shows a further form of a steam generating and superheating plant according to a further aspect of the invention.

Referring to FIGURE 1 of the drawings there is shown an arrangement, sometimes known as a Loeffler boiler, in which feedwater is supplied to a drum 1 through an inlet 2, is evaporated by a stream of superheated steam entering through a steam inlet 3 and distributing nozzle 4, and passes, as saturated steam, through a steam scrubber 5 and outlet 6 to a pump 7 which discharges through a conduit 8 to a superheater 9. A portion of the steam discharged from the superheater 9 passes to a superheated steam outlet 10 from the boiler whilst the remainder of the steam passes to the steam inlet 3. The proportioning of the steam flow to the outlet 10 and inlet 3 is controlled by a suitable valve or orifice plate (not shown). Superheated steam discharged from the outlet 10 passes to steam utilising means 11 (shown in block outline), is condensed, and returned through a suitable feedwater pump (not shown) to the drum 1 through the inlet 2. An auxiliary, conventional boiler 12 (shown in block outline) is necessary to provide a supply of steam which need not necessarily be at high pressure, a suitable pressure being, for example 250 pounds per square inch, requisite for the starting-up of the plant, a non-return valve 13 being provided to isolate the boiler 12 when the remainder of the plant is fully in operation.

By way of examples, ignoring radiation and frictional losses, if an output of steam at a pressure of 2,000 pounds per square inch and temperature of 1,000° Fahrenheit is required, the feedwater temperature being 450° Fahrenheit, for every 100 pounds of steam output it will be necessary to supply to the 100 pounds of water input the following amount of heat:

Heat required to raise the temperature of water from 450° Fahrenheit to the saturation temperature at 2,000 pounds per square inch: 23,900 BThU.

Heat required to evaporate the water at the saturation temperature: 46,300 BThU.

Total heat input required: 70,200 BThU.

The heat available by desuperheating at 2,000 pounds per square inch from 1,000° Fahrenheit is 339.4 BThU per pound.

Therefore it will be necessary to supply approximately 208 pounds of the superheated steam through the steam inlet 2 to evaporate each 100 pounds of feedwater, so that the pump 7 must have a capacity of 308 pounds for every 100 pounds of feedwater, or every 100 pounds of superheated steam output. That is, the pump will have to have a capacity of approximately 3.08 times the output from the plant.

Referring now to FIGURE 2, the boiler of FIGURE 1 has been modified by providing a superheater 9A discharging solely to the steam inlet 3 and providing a second outlet 14 through a steam scrubber 15 from the drum 1 to supply saturated steam to a second superheater 16 having an outlet 17 connected to the steam utilising means 11. As described in connection with FIGURE 1, an auxiliary, conventional boiler 12 is provided for starting-up of the plant.

In this instance the steam output is obtained as saturated steam from the drum 1 and is superheated to the required degree in the superheater 16, so that, by way of example, using the criteria considered in connection with FIGURE 1 it will be necessary to circulate only 208 pounds of saturated steam through the pump 7 for every 100 pounds of superheated steam output. That is, a pump having a capacity of approximately 2.08 times the output from the plant will suffice.

Referring to the alternative arrangement shown in FIGURE 3, the boiler of FIGURE 1 is connected to a cascade of feedwater evaporating drums and superheaters each of which are arranged to impart the full degree of superheat to the steam, the pump 7 serving to circulate the steam through the cascade. Thus the superheated steam outlet 10 discharges the superheated steam through nozzles 18 into a second drum 19 which is supplied with feedwater through an inlet 20. Saturated steam is discharged from the second drum 19 through a scrubber 21 and conduit 22 to a first cascade superheater 23 which discharges the superheated steam through an outlet 24 and nozzles 25 into a third drum 26 supplied with feedwater through an inlet 27. Saturated steam is discharged from the third drum 26 through a steam scrubber 28 and a conduit 29 to a second cascade superheater 30 which discharges the superheated steam through an outlet 31 and nozzles 32 into a fourth drum 33 which is supplied with feedwater through an inlet 34. Saturated steam is discharged from the fourth drum 33 through a steam scrubber 35 and a conduit 36 to a third cascade superheater 37 which discharges the superheated steam through an outlet 38 and nozzles 39 to a fifth drum 40 which is supplied with feedwater through an inlet 41. Saturated steam is discharged from the fifth drum 40 through a steam scrubber 42 and a conduit 43 to a fourth cascade superheater 44 which discharges the superheated steam through an outlet 45 and nozzles 46 to a sixth drum 47 which is supplied with feedwater through an inlet 48. Saturated steam is discharged from the sixth drum 47 through a steam scrubber 49 and conduit 50 to a fifth cascade superheater 51 which discharges through an outlet 52 to the steam utilising plant 11.

The feedwater inlets 2, 20, 27, 34, 41 and 48 are each provided with a non-return, proportioning and water level control valve (not shown) and are connected to a common duct 53, the feedwater being divided between the drums in suitable proportions. The said valves prevent flooding of the vapour spaces in the drums and the superheaters when the plant is not in use. Thus, by way of example, 14% is supplied to the drum 1, 7% to the drum 19, 10% to the drum 26, 15% to the drum 33, 22% to the drum 40 and 32% to the drum 47. Since only 14% of the feedwater input is supplied to the drum 1, for every 100 pounds of superheated steam discharged from the plant, 14 pounds of superheated steam will be discharged from the superheater 9 to the second drum 19. By way of example, using the criteria considered in connection with FIGURE 1, since the drum 1, pump 7 and superheater 9 are similar in arrangement to the boiler shown in FIGURE 1, the flow figures derived in connection with that figure will apply. Thus for every 14 pounds of superheated steam discharged from the superheater 9 to the second drum 19 it will be necessary to discharge 14% of 208 pounds, that is, 29 pounds, of superheater steam from the superheater 9 to the drum 1 and thus 43 pounds of saturated steam will be discharged from the drum 1 to the pump 7. Thus, in this instance, a pump having a capacity of approximately 34% of the output from the plant will suffice.

To put the plant into operation, the auxiliary, conventional boiler 12 is utilised to supply saturated steam to the pump 7 discharging to the superheater 9 to which heat is supplied at a low rate. Steam with a low degree of superheat is discharged from the superheater 9 to the drum 1 and to the second drum 19. The slightly superheated steam supplied to the drum 1 raises the temperature of the water therein to boiling point and vaporises a portion of the water which is supplied, as saturated steam, to the pump 7. The slightly superheated steam supplied to the second drum 19 raises the temperature of the water therein to boiling point and vaporises a portion of the water which is supplied, as saturated steam, to the first cascade superheater 23 to which heat is supplied at a low rate. Steam with a low degree of superheat is discharged from the first cascade superheater to the third drum 26 to raise the temperature of the water therein to boiling point and vaporise a portion of water which is discharged, as saturated steam, to the second cascade superheater 30 to which heat is supplied at a low rate. The process of discharging the slightly superheated steam to an evaporating drum and slightly superheating the saturated steam discharged therefrom is repeated in the fourth drum 33, the third cascade superheater 37, the fifth drum 40, the fourth cascade superheater 44, the sixth drum 47 and the fifth cascade superheater 51. From the fifth cascade superheater the slightly superheated steam is supplied to the steam utilising means 11, is condensed and returned to the auxiliary boiler 12. When the steam flow through the plant has been established the heat input to the superheater is gradually raised and the amount of steam supplied from the auxiliary boiler 12 is gradually decreased until the plant is self-supporting and the auxiliary boiler 12 is isolated from the plant by closing the valve 13.

Referring to the further alternative arrangement shown in FIGURE 4, the boiler of FIGURE 2 is connected to a cascade of feedwater evaporating drums and superheaters each of which are arranged to impart the full degree of superheat to the steam, the pump 7 serving to circulate the steam through the cascade. Thus, the second superheater 16 is utilised as a first cascade superheater discharging through the outlet 17 to nozzles 54 to the second drum 19. The remainder of the plant comprises cascade superheaters 23, 30, 37, 44 and 51 receiving and superheating steam from respective drums 19, 26, 33, 40 and 47 arranged in the same manner as that described in connection with FIGURE 3.

The feedwater is divided between the drums in suitable proportions which, by way of example, may be the same as those set out in connection with FIGURE 3.

Since only 14% of the feedwater input is supplied to the drum 1, for every 100 pounds of superheated steam discharged from the plant, 14 pounds of superheated steam will be discharged from the superheater 9 to the second drum 19. By way of example, using the criteria considered in connection with FIGURES 1 and 2, since the drum 1, pump 7 and superheater 9 are similar in arrangement to the boiler shown in FIGURE 2, the flow figures derived in connection with that figure will apply. Thus for every 14 pounds of superheated steam discharged from the superheater 9 to the superheater 16 it will be necessary to discharge 14% of 208 pounds, that is, 29 pounds, of saturated steam from the drum 1 to the pump 7. Thus, in this instance, a pump having a capacity of approximately 29% of the output from the plant will suffice.

The plant is put in operation in a manner similar to that described in connection with FIGURE 3.

Figure 5:
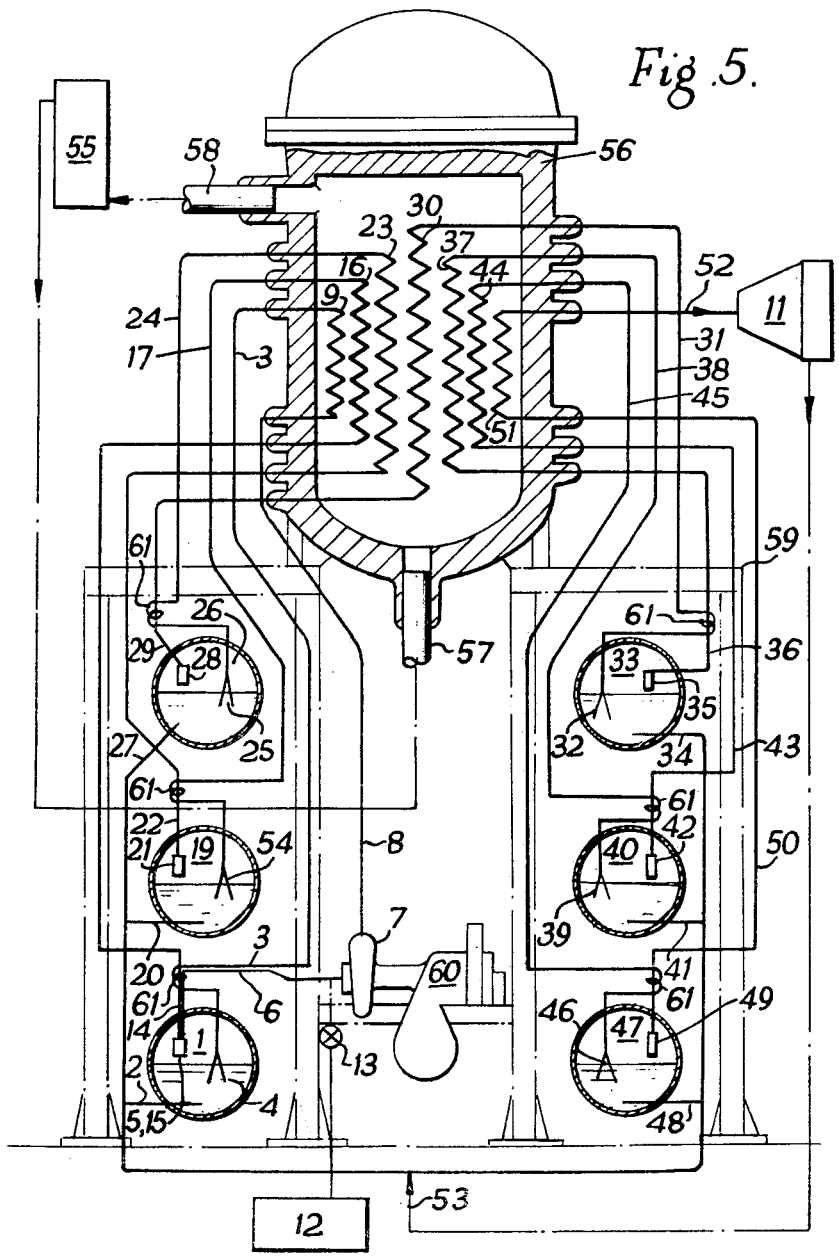
FIGURE 5 shows the layout of a unit utilising the arrangement of FIGURE 4 in conjunction with a nuclear reactor.

Referring to FIGURE 5, the arrangement of FIGURE 4 is shown in a layout suitable for use in conjunction with a nuclear reactor 55 (shown in block outline). All of the superheaters 9, 16, 23, 30, 37, 44 and 51 are disposed within a cylindrical pressure vessel 56 having an inlet 57 and an outlet 58 for liquid metal coolant comprising sodium, potassium or an alloy of these metals forming the primary coolant of the nuclear reactor 55. It will be understood that the superheaters 9, 16, 23, 30, 37, 44 and 51 may be of any suitable configuration, such as multiloop or spiral and of such dimensions that the same degree of superheat will be obtained from each superheater. The pressure vessel 56 is mounted on steelwork 59 which also serves to support the drums 1, 19, 26, and 33, 40, 47 disposed in two vertical tiers on opposite sides of the circulating pump 7 driven by a small condensing steam turbine 60.

In operation, the liquid sodium, potassium or alloy of those metals is circulated in a series circuit including the core of the nuclear reactor 55 and the pressure vessel 56, whilst through the superheaters 9, 16, 23, 30, 37, 44 and 51 is circulated steam which is arranged to be, at the entrances of the superheaters, dry or slightly superheated, the steam leaving the superheaters being utilised to impart the requisite slight degree of superheat in small, additional heat exchangers 61. Thus, should any leakage occur within the pressure vessel 56 from the superheaters, there is little or no danger of explosion since dry or superheated steam and sodium or potassium do not combine explosively.

It will be understood that the drums 1, 19, 26, 33, 40 and 47 are each provided with liquid level control means and that the drums, nozzles 4, 18, 25, 32, 39, 46 and 54 and the scrubbers 5, 15, 21, 28, 35, 42 and 49 together with the superheaters 9, 16, 23, 30, 37, 44 and 51 are proportioned according to the evaporation requirements of the respective drum.

In starting up the plant shown in FIGURE 5, the method described in connection with FIGURE 3 is used, the sodium or potassium or alloy of those metals being first brought to a molten condition by electrical heating elements (not shown). The rate of heat liberation in the associated nuclear reactor 55 is regulated in accordance with the condition of the steam within the superheaters 9, 16, 23, 30, 37, 44 and 51. Whilst the scrubbers 5, 15, 21, 28, 35, 42 and 49 will remove most of the moisture in the steam passing from the drums to the superheaters, since the liquid level control valves maintain the level of the water in the drums below the level of the scrubbers, at least during the initial stages of starting-up, there will not be sufficient heat available in the heat exchangers 57 to ensure that only dry steam passes to the superheaters. Thus it will be necessary to exercise special vigilance during starting-up for leaks in the system.

In a modification (not shown) of the arrangement shown in FIGURE 3, the pump 7 and the drum 1 are omitted, and the superheater 9 is replaced by a superheater supplied with saturated steam from the conventional boiler 12, which is kept in continuous operation instead of being utilised solely for starting-up. The said superheater discharges to the second drum 19 and the remainder of the modification is similar to the arrangement described in connection with FIGURE 3. Starting-up and operation of this modification is similar to that described in connection with FIGURE 3 except that the conventional boiler is kept in operation.

In a modification (not shown) of the arrangement shown in FIGURE 2 or FIGURE 4 the saturated steam outlet 6 and the pump 7 are omitted and saturated steam is supplied from the conventional boiler 12 to the duct 8, the remainder of the respective modification being similar to the arrangement described in connection with FIGURE 2 or FIGURE 4. Starting-up and operation of each modification is similar to that described respectively in connection with FIGURE 2 or FIGURE 4 except that the conventional boiler 12 is kept in continuous operation in each case instead of being utilised solely for starting-up.

What is claimed is:

In combination, a nuclear reactor cooled by a liquid alkali metal coolant selected from the group comprising sodium, potassium and a mixture of sodium and potassium, a heat exchanger vessel, liquid alkali metal coolant conducting ducts connecting the nuclear reactor and the heat exchanger vessel, a steam generating and superheating plant having initial means for generating and superheating steam including a pair of superheating means disposed in indirect heat exchange relationship with the liquid alkali metal coolant in the heat exchanger vessel and each provided with an inlet and outlet, connected to the outlet of a first superheating means of the pair of superheating means an initial direct contact heat exchanger having a nozzle means for effecting direct heat exchange between a body of water in the initial direct contact heat exchanger and a stream of superheated steam discharged from the outlet of the first superheating means of the pair of superheating means to produce a stream of saturated steam, said initial means also including flow dividing means connected to the said initial direct contact heat exchanger to divide the said stream of saturated steam between connections to each of the inlets of the pair of superheating means and further including circulating means positioned in the connection between the flow dividing means and the inlet to the first superheating means of the pair of superheating means, the combination also comprising, disposed in indirect exchange relationship with the liquid alkali metal coolant within the heat exchange vessel, a group of superheating means, each superheating means of the said group of superheating means being provided with an inlet and an outlet, the combination further comprising a group of direct contact heat exchangers, each direct contact heat exchanger of the group of direct contact heat exchangers being provided with an inlet, an outlet and, connected to the inlet, a nozzle means for effecting direct heat exchange between a body of water in the direct contact heat exchanger and a stream of superheated steam discharged through the nozzle, respective direct contact heat exchangers of the group of direct contact heat exchangers and respective superheating means of the group of superheating means being connected alternately in series steam flow relationship, the inlet of the first direct contact heat exchanger of the group of direct contact heat exchangers being connected to the outlet of the second superheating means of the pair of superheating means, the outlet of the first direct contact heat exchanger being connected to the inlet of the first superheating means of the group of superheating means, the inlet to the second direct contact heat exchanger of the group of direct contact heat exchangers being connected to the outlet of the first superheating means of the group of superheating means, the outlet of the said second direct contact heat exchanger being connected to the inlet of the second superheating means of the group of superheating means, inlets of successive direct contact heat exchangers being connected to respective outlets of preceding superheating means of the group of superheating means, the outlets of the said successive direct contact heat exchangers being connected to respective inlets of subsequent superheating means of the group of superheating means, the outlet of the last superheating means of the group of superheating means being connected for discharge to means for utilizing superheated steam and additional indirect heat exchange means interposed between respective direct contact heat exchangers of the group of direct heat exchangers and respective superheating means of the group of superheating means and between the initial direct contact heat exchanger and the pair of superheating means to effect heat exchange between steam leaving and steam entering the said heat exchanger vessel to give the steam entering the said heat exchanger vessel a degree of superheat.

References Cited by the Examiner

UNITED STATES PATENTS

| | | | |
|---|---|---|---|
| 1,917,166 | 7/33 | Trede et al. | 122—33 |
| 2,946,732 | 7/60 | Wootton | 176—31 |
| 2,952,602 | 9/60 | Wootton | 176—60 |
| 2,957,815 | 10/60 | Pacault et al. | 60—108 |
| 2,975,770 | 3/61 | Monson | 122—33 |
| 2,997,032 | 8/61 | Wedel | 122—33 |
| 3,047,479 | 7/62 | Young et al. | 176—53 |
| 3,091,582 | 5/63 | Bradley | 176—60 |

FOREIGN PATENTS 846,996    9/60    Great Britain.

OTHER REFERENCES

Introduction to Nuclear Engineering, R. Stephenson, 1954, pp. 244–245.

CARL D. QUARFORTH, *Primary Examiner.*

REUBEN EPSTEIN, *Examiner.*